Dec. 3, 1968   G. G. BROWN   3,413,987
WASHER STERILIZER AND CONTROL
Original Filed Oct. 21, 1965   6 Sheets-Sheet 1

INVENTOR.
Gilbert Gould Brown
BY
Charles L. Lovercheck
attorney

INVENTOR.
Gilbert Gould Brown
BY
Charles L. ...
Attorney

Dec. 3, 1968   G. G. BROWN   3,413,987
WASHER STERILIZER AND CONTROL
Original Filed Oct. 21, 1965   6 Sheets-Sheet 3

INVENTOR.
GILBERT G. BROWN
BY
Charles L. Lovenshul
Attorney

Dec. 3, 1968    G. G. BROWN    3,413,987
WASHER STERILIZER AND CONTROL
Original Filed Oct. 21, 1965    6 Sheets-Sheet 4

INVENTOR.
GILBERT G. BROWN
BY
Charles L. Lounsbach
Attorney

Dec. 3, 1968  G. G. BROWN  3,413,987
WASHER STERILIZER AND CONTROL
Original Filed Oct. 21, 1965  6 Sheets-Sheet 5
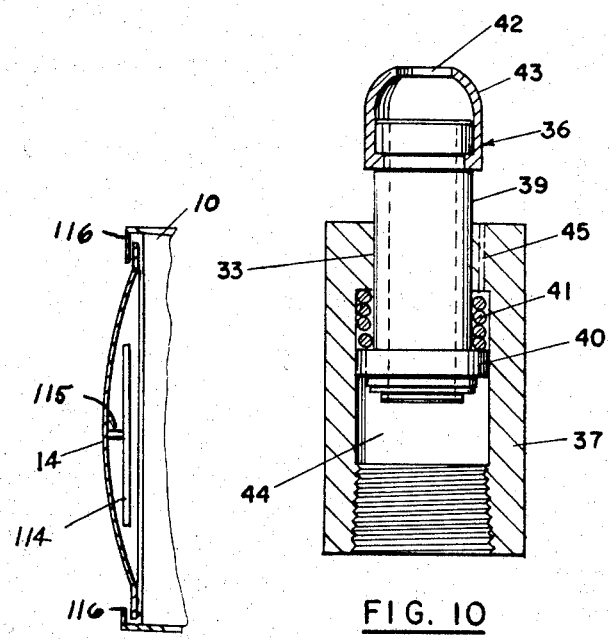
FIG. 10
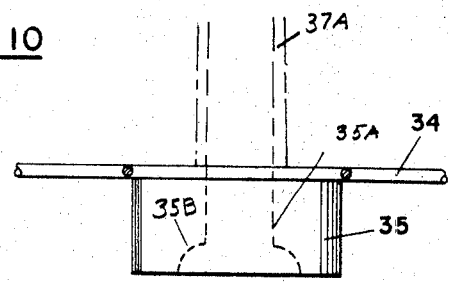
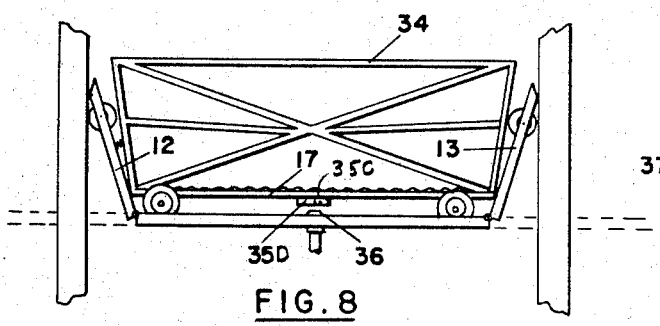
FIG. 8
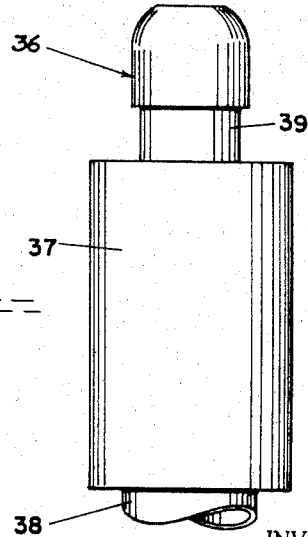
FIG. 9
FIG. 12
INVENTOR.
Gilbert Gaill Brown
BY
Charles L. Lundbeck
Attorney United States Patent Office 3,413,987
Patented Dec. 3, 1968

3,413,987
WASHER STERILIZER AND CONTROL
Gilbert Gould Brown, Erie, Pa., assignor to American Sterilizer Company, Erie, Pa., a corporation of Pennsylvania
Continuation of application Ser. No. 499,321, Oct. 21, 1965. This application Dec. 18, 1967, Ser. No. 691,652
13 Claims. (Cl. 134—46)

ABSTRACT OF THE DISCLOSURE

A combination washer sterilizer and a specific water dispensing means wherein a movable nozzle is moved into engagement with load supporting means in the sterilizer by means of water pressure behind a movable nozzle. The movable nozzle has a flange that is slidably received in the hollow member. The flange is provided with a sufficient clearance to allow some water to flow past the flange and a bleed hole is provided in the hollow member so that the water that goes past the flange can bleed out of the hollow member. A suitable seat is provided above the nozzle so that the nozzle will be forced into engagement with the seat by water pressure. Thus, the flow of water through the nozzle holds it in engagement with the load support so that water can be sprayed onto the dishes supported on the load support.

---

This is a continuation of application Ser. No. 499,321, filed Oct. 21, 1965, and now abandoned.

This invention relates to cleaning devices and, more particularly, to the type of cleaning devices generally known as washer sterilizers.

The improved washer sterilizer disclosed herein includes several improvements in the washer sterilizer itself as well as improvements in certain subcomponents thereof which will more fully appear hereinafter.

The washer sterilizer disclosed herein is made up essentially of a pressure chamber having tracks in it to support work loads to be processed and an entrance and an exit door. Suitable spray arms are provided in the chamber and an external pump for circulating cleaning fluid.

The machine is closed to atmosphere during water filling time. Therefore, the water that enters the machine displaces a certain amount of air and slightly pressurizes the chamber. This increases the NSPH of the pump which is one of the reasons the machine may be used on the same floor with the pump instead of having the pump on the floor below.

A transfer car loaded with a dolly, loading fixture, and items to be processed may be pushed up to the entrance of the washer sterilizer and the dolly moved into the chamber. When the transfer car is locked to the elevator at its lower level, this simultaneously releases a catch and, thus, the loaded dolly glides onto the automatic elevator. The dolly actuates a small micro air valve which causes the elevator to rise to the full height, at which time the track on the elevator registers with the level and angle of the fixed track just in front of the chamber. The dolly rolls into the chamber by gravity. There are, in effect, two loading positions in front of the machine as well as two in back of the machine. The one loading position in front is the elevator and the other is the fixed pair of tracks just in front of the door of the chamber.

Important features of the machine are the automatic locking of the transfer car to the input of the machine, the automatic release of the dolly from the transfer car, the automatic rising of the elevator, the automatic release of a loaded dolly from the risen elevator to the fixed position in front of the machine, and the automatic release of a loaded dolly into the machine.

In operation, one door of the machine is always closed. This is especially important when the installation is made between two rooms, one sterile and one contaminated. Also, there may be a pressure differential between the two rooms which, if both doors were open, would cause air from the contaminated room to flow into the sterile room.

When either the front or the back door opens, a pair of pivoted or hinged tracks having rollers on their outer or free ends follows the door as it moves upwardly or downwardly to open or closed position. The tracks then engage the external tracks on the conveyor section. The loaded dolly must be in exact position between the front and rear doors so that water may be automatically introduced through a manifold on the type of fixtures which require water to be fed to spray nozzles associated with the loading fixture.

Since the wheels of these dollies are flanged, there is a minimal problem in lateral alignment. The major problem is obviously one of longitudinal alignment. Since the rear door is closed when the dolly enters the machine, the pivoted or hinged track is up at probably a thirty-five or forty degree angle as the dolly enters the machine. This gives a very definite stop and positioning of the center of the loaded dolly over the rising water valve. Then as the front door closes, the other pair of tracks is positioned which, in effect, nestles the dolly in a V-block.

Another important feature of the machine is that when the rear door is closed and the dolly enters the machine, the dolly wheels engage the rising tracks which are held up at, for example, a forty-five degree angle and the dolly is stopped by these tracks. When the front door is closed, a pair of springs associated with the pair of rising tracks is cocked and exerts a pressure against the dolly. The dolly, however, cannot move toward the exit door since the exit door tracks are held up by the rear door which restrains the forward motion of the dolly. When the rear door is opened and the tracks fold down and outward, the springs start the dolly to move out of the machine. These springs do very efficiently and inexpensively what a hydraulic cylinder or other type of motivating device would otherwise do. When the rear door opens and the pair of tracks swings down, the front tracks which contain a spring push the dolly and start it, thereby breaking away the friction which would otherwise hold the dolly in place. Therefore, the loaded spring causes the dolly to start and gravity then moves it out of the machine because of the inclined track.

As the loaded dolly enters the machine and is almost entirely therein, a tab on the dolly actuates a micro air valve which causes the front door to close. As the front door closes, it pushes the dolly entirely into the machine because of the rising of the hinged tracks and centers it as aforesaid. When the door gets all the way shut, an air valve operates a spool valve which inflates the inflatable seals around the entrance and exit doors simultaneously. When the seals are inflated to the pressure desired, a pressure switch associated with the inflatable seals operates an electrical circuit which starts the overall cycle as follows:

The timer motor on the program timer system is actuated. Concurrently with this, the cold water electrical solenoid valve is opened which, in conjunction with a cam on the program timer and a flow rater, meters exactly six gallons of water into the sump. This is done irrespective of water pressure since the flow rater delivers the same amount of water irrespective of water pressure. The pump is not started until the six gallons of water are in the sump. This is to curtail cavitation erosion of the impeller and pump housing. Another reason is that the machine would not function unless and until there is six gallons of water in the sump as will be pointed out more specifically later herein. This first phase of the overall cycle is known as the warm water pre-wash. (The cold water has been warmed by the residual heat in the shell which was introduced by the high temperature wash and/or sterilization phase in the preceding process cycle.) A cam on the timer actuates a relay and starts the pump immediately after the water sump is filled. The load is pre-washed about one-half minute, for example. A cam then actuates a switch which opens the steam valve which injects steam directly into the water sprays which are thereby heated. This is done since the heat conversion efficiency is essentially 100% with this system as opposed to 40% to 50% as on conventional types of heat exchangers.

The second phase in the overall cycle is the detergent wash. Due to the high heat conversion efficiency attained by this machine, the water is raised to the desired temperature in a few seconds. The machine then runs for a predetermined time; for example, approximately three and one-half minutes, during which time nozzles spray water onto the items loaded into the fixtures on the dolly which is now in the chamber.

Each spray arm contains six nozzles and the spray arms revolve by the jet reaction principle. The spray nozzles are so designed that as the arms are revolved the water strikes every part of the load in the fixture directly from the sprays or indirectly by the ricochet principle.

It is an important feature of the present invention that spray arms are also in the front and rear doors so that spray coverage is obtained front and rear as well as from the sides, top, and bottom. This feature is made possible by the unique shape of the door and it is not possible with the conventional types of doors.

At the conclusion of the wash phase, a drain valve is opened and the machine is very rapidly drained by a combination of gravity and the suction of the pump. The draining time is fixed and extremely accurate since the quantity of water is always the same and the suction effects from the pump are always the same. Therefore, it is possible to time the water out of the machine in this way as opposed to using a complicated flow switch system to control the drain valve.

When the cam which operates the drain valve times out, it closes the drain valve and another cam actuates an electrical switch which opens the hot water valve. The pump runs during the operation since cavitation erosion induced by doing this is not as serious as the reduced life expectancy of the pump produced by starting and stopping it frequently during the overall cycle.

It is practically impossible to drain all of the soapy water out of all of the piping system, sump, valves, pump, and spray arms. Therefore, at the end of the first post rinse, there remains some undesirable detergent laden water in the machine. The first rinse time is very short and serves to remove most of the detergent laden water.

It has been discovered that excessive rinsing on a recirculating type of rinse causes redeposition of particulate matter and mineral deposits on the items being rinsed. Therefore, the first post rinse is limited to a few seconds; for example, ten or fifteen.

When the water from the first rinse has been expelled, the valve closes and additional hot water enters the system and provides for a final or clean-up rinse. This additional water dilutes the detergent laden water to a point that is quite acceptable to most types of rinsing.

If absolutely detergent free rinsing is required such as needed for laboratory glassware, one or more additional rinses are programmed into the machine. These additional rinses are not normally used in the interest of time and water economy.

The pump housing has two outlets, one at the bottom which permits complete draining of water from the sump and pump. The top outlet prevents air entrapment in the pump housing as well as the elimination of two elbows which introduce pressure drops.

At the end of the second post rinse, the machine would normally enter the sterilization phase. As mentioned previously, the loaded dolly has a tab on it which actuates a memory circuit (locking type relay) as the dolly enters the chamber. This memory circuit would, at the end of the second post rinse, bypass all the other automated circuits, open the rear door, and not sterilize that particular load. If a tray enters the chamber which does not have a tab on it, the memory circuit is not set up and the machine goes through the normally designated procedure. Thus, by providing the memory circuit on the machine, various types of processing cycles can be preselected and carried out automatically.

The air is completely removed from the chamber during the sterilization cycle through a very large opening through which the steam can push the air downward and out through the drain. This air removal is extremely important in the sterilization phase since an admixture of air and steam produces a lower temperature for a given pressure. Since the opening is relatively large, the air is pushed out rapidly. After a predetermined time, the valve at the drain to this large opening is closed and the coolness of the condensate which collects opens the thermostatic steam trap which closes when steam reaches the trap. The sterilizing timer is started when the temperature in the chamber reaches 275° F. This timer will continue to run until the load has been sterilized; however, if, for any reason, the temperature drops below 271° F., the timer will recycle and start all over again. In this manner, a specific sterilization time at the temperature of 275° F. is assured. After a complete sterilizing phase, the main program timer is again actuated and the cycle is continued. The following takes place:

The drain valve opens concurrently with the opening of two smaller valves which furnish water for nozzles which spray cold water into the effluent of the machine to reduce its temperature to a legally accepted amount. After several seconds, one of these valves turns off since water emanating therefrom is no longer needed and this is done in the interest of conserving water. At a predetermined time later, the other water valve is turned off and, at that time, the chamber pressure has been reduced from that corresponding to wet steam at 275° F. to atmospheric pressure and the machine has been drained. The pressure switch associated with the internal pressure of the machine is now actuated by the reduced pressure and will now permit the seals at the doors to deflate. After the door seals have been deflated, the pressure switch associated with them permits the timing mechanism to open the rear or discharge door.

When the rear door opens, the spring loaded compression previously referred to urges the dolly to move out of the machine. When the dolly is completely out of the machine at the exit conveyor, a micro air valve (similar to a limit switch) actuates a four-way spool valve which supplies air to a vertically disposed air cylinder which closes the rear door. When the rear door is fully closed, another air valve furnishes air which opens the front door and another full cycle of the machine may be carried out. If there is no load waiting to be processed, the machine is, in effect, shut down until a load arrives at the elevator.

The machine will not operate and will close down if any of the following conditions exist:

(1) If the water supply to the machine has been shut off;

(2) If the operator has failed to replace the filter in the sump; or (3) If the filter is clogged sufficiently to prevent the recirculation of approximately 85 gallons of water per minute.

The foregoing is achieved in the following manner:

The starvation of a centrifugal type pump produces a reduced and varying pressure at its output. This principle, coupled with a pressure switch, is used in the output circuit of the pump to determine that the pump is being starved by one of the aforementioned conditions.

After the machine has accepted six gallons of water and the pump output pressure has stabilized, a cam on the timer alerts a pressure sensing device which contains an electrical switch. If, for any reason, this switch is not closed, it opens up the main power circuit to the machine and stops it. This has the following advantages:

(1) It prevents a load from going through a complete cycle in the machine without sufficient water for washing and/or rinsing.

(2) It prevents the machine from being operated when the filter is clogged and should be washed. Also, it advises the operator that the filter must be taken out and cleaned.

(3) There is a small paddle which drops down in front of the input to the eye of the pump which causes the pump to starve and this paddle is lifted up automatically when a filter is placed into the machine, thereby permitting water to enter the eye of the pump.

There are two methods disclosed for introducing detergent into the machine:

(1) The detergent may be introduced into the machine at the fixture loading area remotely located from the machine. This is accomplished by using a dissolvable bag such as may be made from polyvinyl alcohol film. This is filled with detergent and placed in the fixture when they are loaded with items to be processed. The bag will be dissolved in the second phase (hot water wash phase) of the overall cycle.

To be assured that the dolly will not leave the loading area without containing a bag of detergent, a balance beam arrangement is used which, if unbalanced by the omission of the bag, a paddle would strike a fixed stop at the exit of the loading area. This would prevent the dolly from passing on down the conveyor and into the machine.

To prevent a dolly which has been loaded in such a manner that articles extend out beyond the door opening from jamming the machine, a hoop arrangement is placed at the loading area just ahead of the conveyor. This prevents improperly loaded dollies from leaving the loading station. Also, a second hoop is placed on the conveyor prior to the entrance to the machine.

An electrical or air switch is actuated when and if the overloaded dolly impinges against the hoop. This stops the conveyor and prevents jamming of the machine.

(2) Liquid detergent can also be injected into the machine. The device disclosed is a liquid tank, pressure regulator, timer, and flow rater. The exact amount of liquid detergent can thus be placed into the machine and metered very accurately.

The detergent tank utilizes a tube containing three magnetic reed type switches. Around the tube is a doughnut type floating magnet. This results in the following advantages:

When the detergent supply is depleted to the point that only a given amount of detergent remains, a signal is given, indicating that detergent should be added. This is accomplished by the center reed switch.

The top reed switch indicates when the detergent tank is full. At this point, a warning light is turned on.

The third reed switch is so positioned that it will operate a warning light when the detergent supply tank contains only several hours supply of detergent.

The bottom reed switch shuts down the machine in the event that the detergent tank is completely emptied and an empty indicator light is turned on.

It is, accordingly, an object of the present invention to provide an improved washer sterilizer.

Another object of the invention is to provide a washer sterilizer which is simple in construction, economical to manufacture, and simple and efficient to use.

Still another object of the invention is to provide an improved load positioner in a washer sterilizer.

Yet another object of the invention is to provide an improved means for metering washing water and dispensing said washing water inside a washer sterilizer.

A further object of the invention is to provide an improved means for supplying water under pressure to a pump.

It is a further object of the invention to provide an improved means for discharging a load of goods from a washer sterilizer.

Yet a further object of the invention is to provide an improved control means for a washer sterilizer.

Still yet a further object of the invention is to provide an improved cleaning cycle for goods in a washer sterilizer.

It is still yet a further object of the invention to provide an improved means for discharging cleaning fluid in a washer sterilizer.

Yet another object of the invention is to provide an improved means for controlling the liquid in a washer sterilizer.

It is yet another object of the invention to provide an improved detergent dispensing and indicating device.

Still yet another object of the invention is to provide an improved way of increasing the NSPH of a pump connected to a washer sterilizer.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and details of construction without departing from the spirit or sacrificing any of the advantages of the invention.

In the drawings:

FIG. 8 is an enlarged view of the dolly locked in position inside the washer sterilizer;

FIG. 9 is an enlarged view of the device for connecting the water to the tray;

FIG. 10 is a cross sectional view of the device shown in FIG. 9;

FIG. 12 is a longitudinal cross sectional view of one of the doors of the device.

Figure 1:
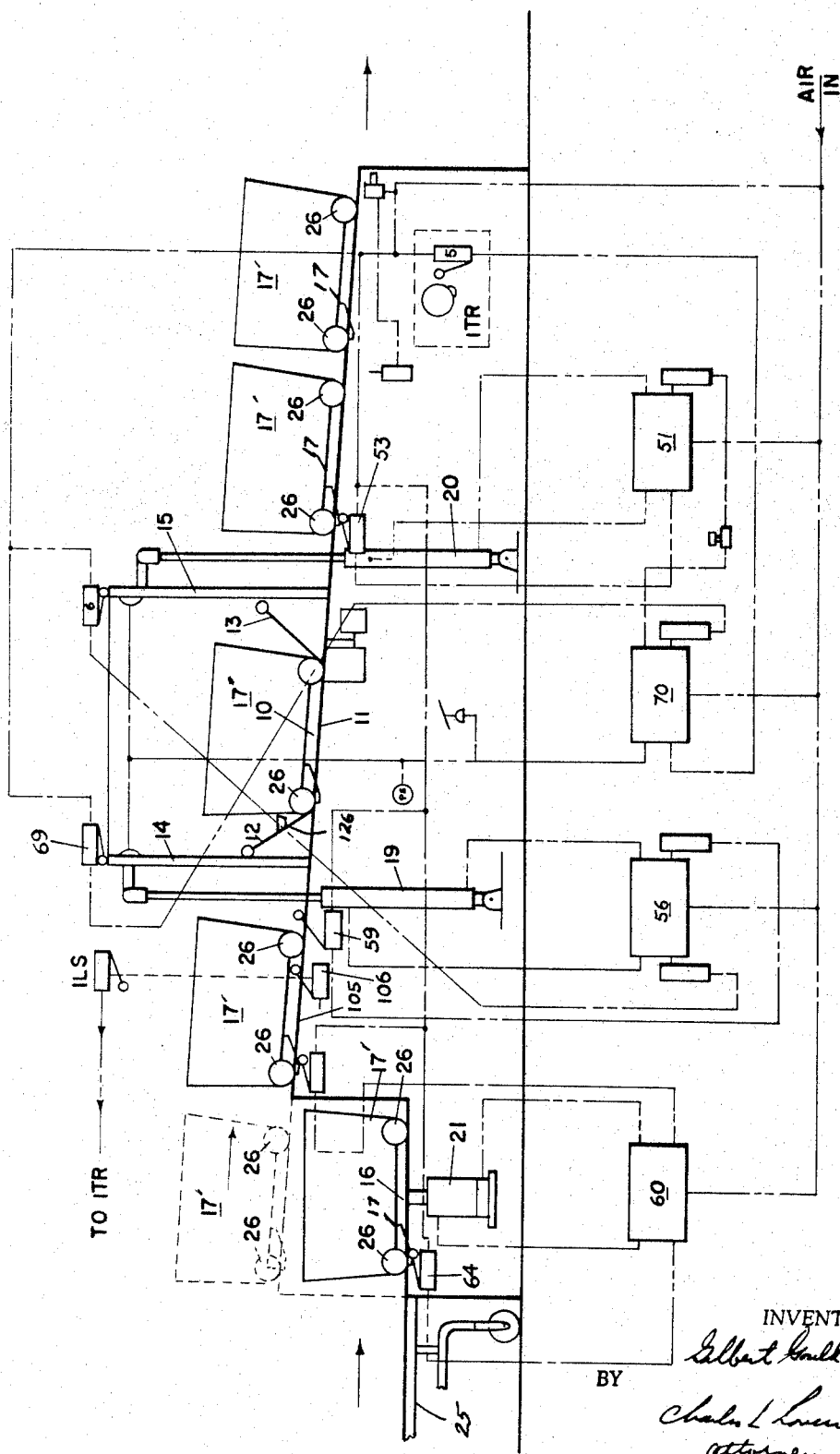
FIG. 1 is a diagrammatic view of a washer sterilizer and associated control means according to the invention.
Figure 2:
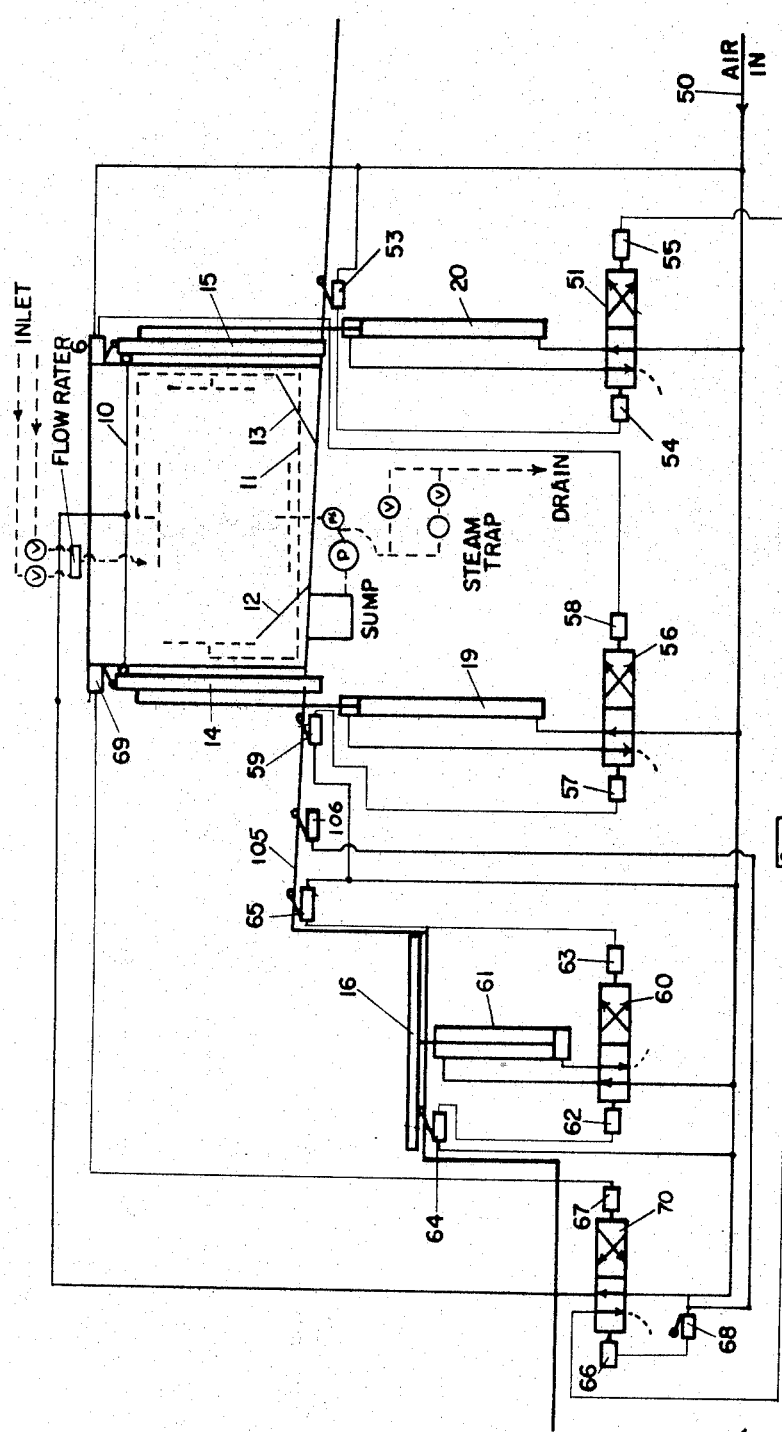
FIG. 2 is a pneumatic schematic circuit of the washer sterilizer and control circuit according to the invention.

In the specific embodiment of the invention which is shown for purposes of illustration and example only, the washer sterilizer is made up generally of a chamber with pump and circulation circuit and a transfer car.

A transfer car loaded with a dolly 17, loading fixture 17′, and items to be processed may be pushed up to the entrance of the washer sterilizer and the dolly 17 moved into a chamber 10. When the transfer car is locked to an elevator 16 at its lower level, this simultaneously releases a hook or catch 31. Thus, the loaded dolly glides onto the automatic elevator 16. The dolly 17 actuates a small micro air valve 64 which causes the elevator 16 to rise to the full height, at which time the track on the elevator registers with the level and angle of the fixed track 105 just in front of the chamber 10. The dolly 17 rolls into the chamber 10 by gravity. There are, in effect, two loading positions in front of the machine as well as in back of the machine. The one loading position is the elevator 16 and the other is the fixed pair of tracks 105 just in front of the door of the chamber.

The chamber 10 has an inclined track 11 therein. The track is inclined as indicated. The part 12 of the track adjacent the inlet door swings upwardly when the door 14 closes and the inclined section 13 of the track swings upwardly when the door 15 closes. Thus, the dolly 17 in the chamber is trapped in a cradle formed by the swinging sections of track and is held positively in position. The elevator 16 supports the dolly 17 and moves it from the solid line position shown at the elevator 16 to the dotted line position shown where it can be rolled onto the inclined track 11.

The doors 14 and 15 are of the guillotine type such as those disclosed in patent application, Ser. No. 346,726, and are moved upwardly and downwardly by the pneumatic cylinders 19 and 20 and elevator 16 is moved upwardly and downwardly by pneumatic cylinder 21.

Figure 6:
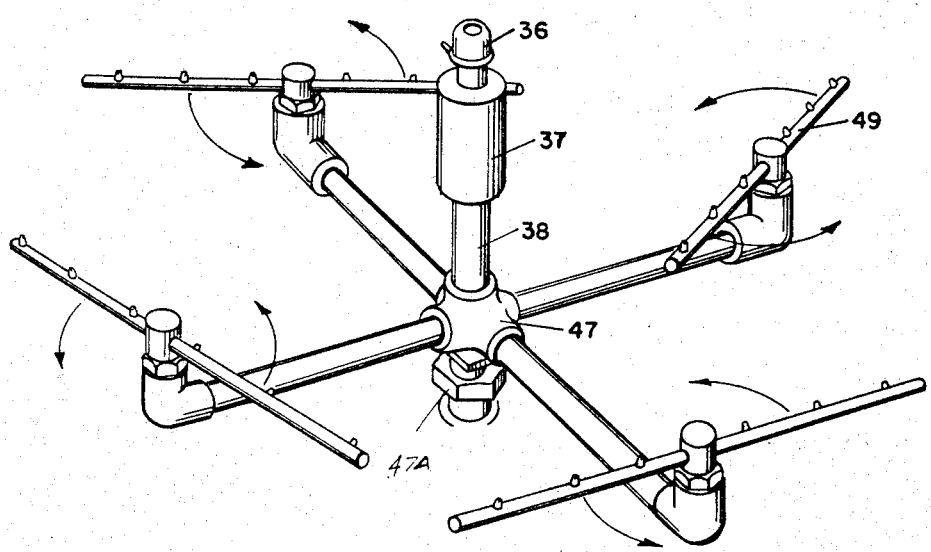
FIG. 6 is an enlarged view of the spray arms according to the invention.

The doors 14 and 15 each have a rotating arm having nozzles thereon as shown in FIG. 12. In this figure, the arm 114 is supported on a roller bearing 115 and it has nozzles on it similar to the nozzles shown on the arms 49 in FIGS. 6 and 7. Since the arm 114 is supported in the concave door 14, it can rotate freely and does not interfere with the door moving up and down within the lugs 116.

Figure 4:
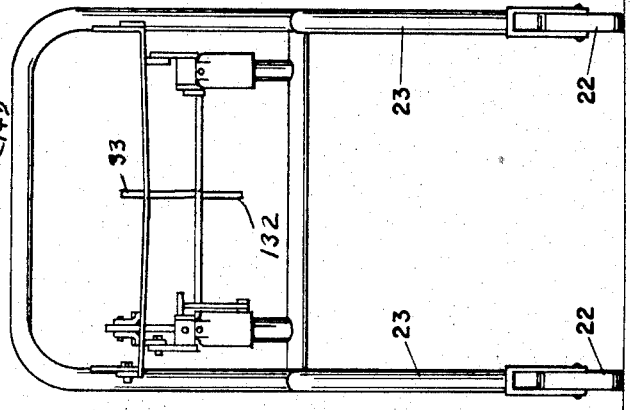
FIG. 4 is an end view of the transfer car shown in FIG. 3.
Figure 5:
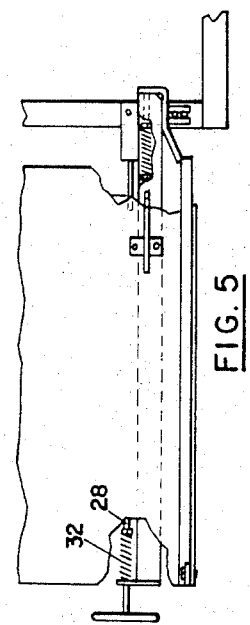
FIG. 5 is a partial top view of the car shown in FIGS. 3 and 4.
Figure 3:
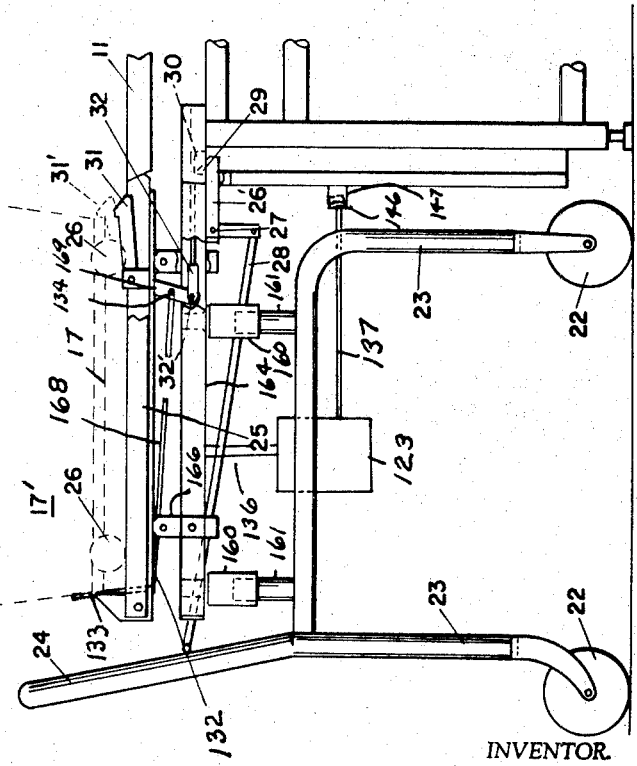
FIG. 3 is a side view of a transfer car according to the invention.

The transfer car shown in FIGS. 3, 4, and 5 is supported on wheels 22 through legs 23 and has the handle 24 on the end thereof remote from the sterilizer. A dolly track 25 receives the wheels 26 of the dolly. A latching mechanism is made up of the latch 26' which is swingably supported on the transfer car. As an alternative, the transfer car may have an elevator thereon. The elevator is intended to make it possible to vertically align the dolly tracks 25 with the inclined tracks 11. Also, the elevator can be lowered to facilitate loading. The transfer car elevator is made up of the telescoping supports 160, which receive the vertical roads 161 fixed to the legs 23. A cylinder 123 is fixed to the legs 23, and it has a piston therein connected to the piston rod 136. The piston rod 136 is connected to the support 164 which in turn supports the dolly tracks 25. Dolly tracks 25 may be adjusted by means of the lugs 166 so that they incline downward and toward the tracks 11.

An air line 137 is connected to the cylinder 123 and to the nipple 146. The nipple 146 will engage a female member 147 on the washer sterilizer, having a suitable check valve therein so that when the transfer car is moved against the washer sterilizer air will be supplied through line 137 and will move the elevator up.

When the transfer car is locked to the washer sterilizer, the dolly is started to move toward the tracks 11 by an interlocking arrangement. This interlocking arrangement is made up of rods 168 connected at 134 to the bell crank 169 that is in turn fixed to the hook 31. Therefore, when the hook 31 engages the washer sterilizer and is moved down, the rear upwardly extending end 133 of rod 168 engages the dolly and urges the dolly to move forward down the inclined dolly tracks 25 and on to the inclined tracks 11.

The member 47 which supports the spray arm may be rotatable around spring loaded bearing 47A which may be rotated a part of a revolution against a tension spring, to make it possible to move the arms from over the sump. The tension spring will return the arms to the position shown when they are released.

A spring may be provided to bias the member 47 so that when released it will swing back to a predetermined position. The transfer car at 27 has a handle 28 attached thereto which extends to the rear of the transfer car so that the operator can grasp the handle and unlatch the hook 29 on latch 26' on the transfer car by hook 31 which is swingably supported on the transfer car and has an actuating mechanism 32 which is released when it engages the sterilizer. When the transfer car is away from the washer sterilizer, the hook 31 is in the dotted line position 31' holding the dolly in place. When the transfer car is brought up into engagement with the sterilizer, the mechanism 32 is actuated to swing the hook 31 down so that the dolly 17 can roll from the dolly track 25 to the track 11 on the washer sterilizer. The handle 23 is urged to swing the hook up and into the notch 30 by means of the spring 32'.

Figure 7:
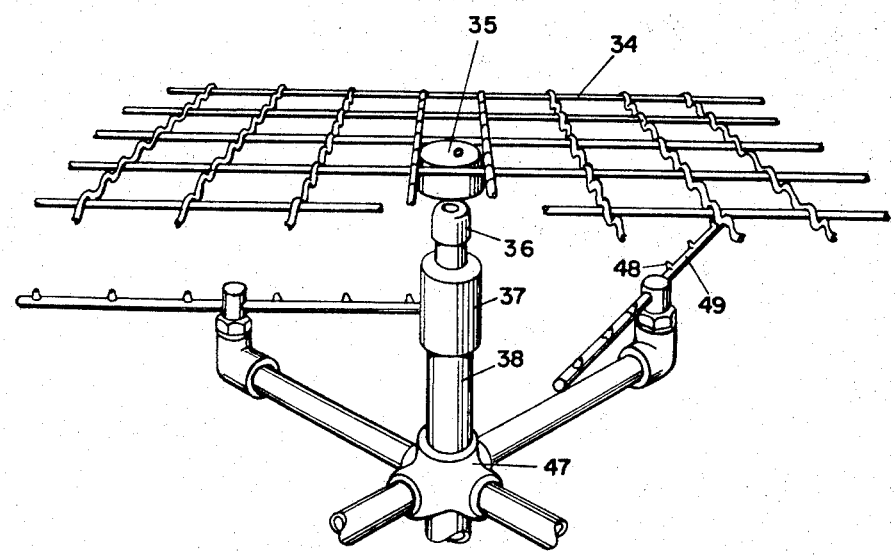
FIG. 7 is a view of the spray arms, nozzle, and device controlling water flow.
Figure 13:
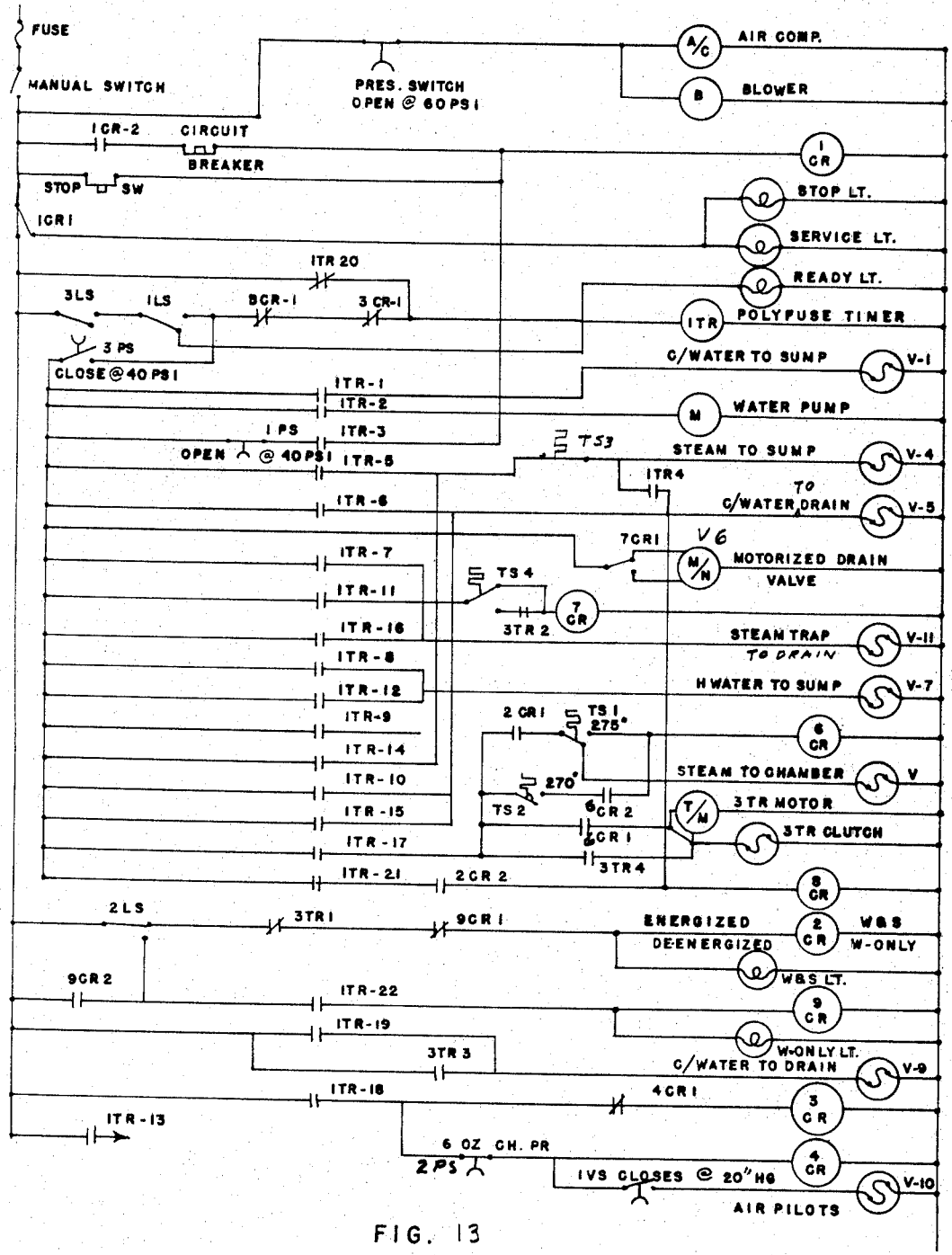
FIG. 13 is a schematic electrical diagram for the machine.

The dolly 17 will support trays and some of the trays 34 will have a device 35 as shown in FIG. 7 fixed thereto. This device 35 will be supported directly above the nozzle 36. The nozzle 36 is shown in detail in FIGS. 9 and 10. The nozzle has a fixed body portion 37 which is fixed to a hot water pipe 38. The hot water pipe providing filler means will be connected to the output side of pump 38'. The pump 38' has a large inlet 238.

Figure 11:
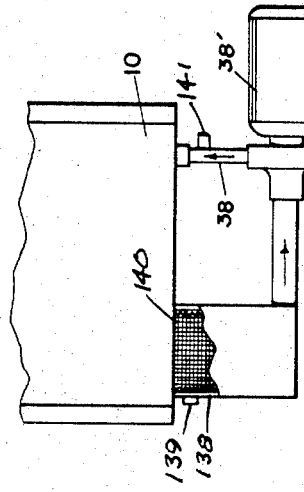
FIG. 11 is a side view of the sump and pump according to the invention.

In FIG. 11, the pump 38' has the outlet 38 connected to the chamber 10 and the inlet 238 is connected to the strainer cover 138. The suitable detergent connections may be provided at 139 and 141 for injecting detergents into the machine. The valve 144 may be connected to the machine by means of solenoid 145.

The body 37 has a flange 33 at the top and a telescoping member 39 reciprocably slides inside of the flange 33. The telescoping member 39 has a flange 40 on its lower end and the spring 41 is supported between the flange 40 and the flange 33. Thus, the nozzle member 37 is urged downward. An opening 42 in the upper end of the head 43 will discharge water therefrom. Thus, when water or other fluid under pressure is injected into chamber 44 in the flange 33, the pressure thereof is exerted on the lower end of flange 40 and forces telescoping member 39 up into engagement with the device 35 thus stopping the flow therethrough. The water bleeds out through an opening 45 and there is a constant flow so that the pressure in chamber 44 maintains the nozzle in engagement with the device 35. If there is no device 35 on a particular tray, the flow of water from the opening 42 will be unobstructed.

When certain types of articles are to be washed, it is desirable to have a spray supported on the dollies themselves. If a particular dolly has spray arms built into it, the nozzle 37 will connect the water supply to the built-in spray arm indicated generally at 37A. Then when water engages the lower side of flange 40, it will force member 39 up until head 43 engages seat 35B of member 35 and water flows through opening 35A into spray arms 37A which extend above the articles in the tray.

When a dolly enters the chamber that has no built on spray arms, the member 350 will have a blind hole, above the seat therein. Thus, when the nozzle 36 is forced up into engagement with a seat like seat 35B, water flow through the nozzle will be shut off. A bleed hole 35C of very small diameter is formed in the bottom of the blind hole. Thus, the bleed hole relieves the pressure above the nozzle and allows the nozzle to seat firmly in the blind hole, thereby shutting off the flow of water from the nozzle except through the bleed hole.

In the meantime, water is disposed in manifold 47 and is ejected from the nozzles 48 in the rotating arms 49. These rotating arms are rotated by jet pressure and thus spray the objects to be cleansed in the washer sterilizer.

With regard to the specific circuit disclosed, the doors 14 and 15 are moved upwardly and downwardly by the cylinders 19 and 20 which are actuated by air from the main air line 50. The valve 51 is a four-way valve which is shown in a conventional symbol indicating that it is controlled by air from solenoid 52 and from limit switch 53. Thus, when a dolly moves out of the chamber, it will actuate the limit switch 53, thereby actuating the pilot control 54 on the valve 51, admitting air in cylinder 20 and closing the door behind the dolly that has moved out. When the solenoid 52 is actuated by a suitable timer, it will actuate the pilot 55 and open the door 15.

The piston in cylinder 19 is controlled by the four-way valve 56 which has pilots 57 and 58 thereon. These pilots will connect main line air, either above or below the piston in cylinder 19, depending upon the actuating from the limit switch 59 which will close the door 14 when the particular dolly moves off of it and into the chamber. At that time the door 14 is closed when the limit switch 6 is engaged by the door 15 in its closed position.

The four-way valve 60 controls the upward and downward movement of elevator cylinder 61 which in turn controls the elevator 16. This valve 60 is controlled by pilots 62 and 63 which are actuated by limit switches 64 and 65, respectively. The inflatable seals around the doors 14 and 15 which are of the type disclosed in patent application, Ser. No. 346,726, are controlled by the four-way valve 70. The four-way valve 70 has pilots 66 and 67 which are actuated first by timer 68 which will inflate the seals at the end of a cycle and by door switch 69 which is actuated when door 14 is closed.

It will be noted that when a transfer car with a dolly on it is locked to the sterilizer, latch hook 31 will descend and allow the dolly the roll onto elevator 16. The dolly will engage switch 64 which will actuate pilot 62, shift the spool in valve 60 and raise the elevator.

The dolly will run by gravity from the elevator onto track section 105 and there will in sequence engage switches 65, 106, and 59. Switch 65 will actuate pilot 63 and lower the elevator, switch 59 will actuate pilot 57 and close door 14 when the dolly passes over it on its way into the chamber.

At the end of the time cycle, timer 68 actuates valve 70 and deflates the door seals and solenoid 52 actuates the pilot 55 on valve 55′ and opens door 15. It will be noted that doors 14 and 15 can never be opened at the same time.

The operation of the electrical circuit is as follows:

As the loaded dolly enters the machine and is almost entirely therein, a projection on the dolly actuates a micro air valve which causes the front door to close. As the front door closes, it pushes the dolly 17 entirely into the machine because of the rising of the hinged tracks and centers it as aforesaid. When the door gets all the way shut, the air valve operates valve 70 which inflates the inflatable seals around the entrance door 14 and exit doors 15 simultaneously. When the seals are inflated to the pressure desired, a pressure switch 3–PS associated with the inflatable seals operates an electrical circuit which starts the overall cycle as follows:

The timer motor 1TR on the program timer system is actuated. The timer 1TR is a program timer which may have a plurality of cams on a common shaft driven at a constant rotational rate that may be set to program the opertion of the contacts 1TR–1 through 1TR–22 to operate at definite timed intervals. The cold water electrical solenoid flow control valve V–1 is opened by 1TR–1 which, during the time 1TR–1 is closed, meters exactly six gallons of water into the sump after which time 1TR–1 opens.

The cam on timer 1TR then closes 1TR–2 which starts pump M and the load is pre-washed about one-half minute, for example. The cam on timer 1TR then actuates 1TR–5 which opens the steam valve V–4 which injects steam directly into the water sump and thereby heats the water.

At the conclusion of the wash phase 1TR–7 is closed by the timer which opens drain valve V–6 and the machine is very rapidly drained by a combination of gravity and the suction of the pump.

When the cam on 1TR opens 1TR–7 and drain valve V–6 opens, 1TR–8 drain valve closes and operates the hot water valve V–7. The machine then washes for a predetermined time until 1TR–11 opens V–6 and drains the hot water.

When the water from the first rinse has been drained, 1TR–11 opens and valve V–6 closes and 1TR–12 opens V–7 and additional hot water enters the machine and provides for a final or clean-up rinse.

At the end of the second post rinse, the machine would normally enter the sterilization phase. However, if the dolly has a projection on it, it will actuate 2–LS which will energize 2–CR and will close 1TR–16 which will open drain valve V–6. Then when the pressure in the chamber through 2–PS is reduced to six ounces and the pressure in door seals drops to twenty inches of vacuum through 1–PS, V–10 will actuate solenoid 52 which will operate valve 51 and open the door 15. If a tray enters the chamber which does not have a projection on it, the memory circuit is not set up and the machine goes through the normally designated procedure.

After a predetermined time, the drain valve V–6 is closed by 1TR–16 which opens and actuates the thermostatic steam trap V–11. The sterilizing timer 3TR is started by 1TR–17 when the temperature in the chamber reaches 275° F. and TS–1 closes, which actuates 6–CH which starts timer 3–TR. This timer 3–TR will continue to run until 3–TR times out and the load has been sterilized; however, if, for any reason, the temperature drops below 271° F., TS–2 will open and opens relay 6CR, and the timer 3–TR will recycle and start all over again through TS–1 which will actuate 6CR and which in turn actuates 3–TR. In this manner, a specific sterilization time at the temperature of between 271° and 275° F. is assured. After a complete sterilizing phase, the main timer 1TR is again actuated through 1TR–20 and the cycle is continued. The following takes place:

The drain valve V–6 opens concurrently with the opening of two smaller valves V–9 which furnish water for nozzles which spray cold water into the effluent of the machine to reduce its temperature to a legally accepted amount. After several seconds, one of these valves V–9 turns off since water emanating therefrom is no longer needed. At a predetermined time later, the other water valve V–5 is turned off and, at that time, the chamber pressure has been reduced from that corresponding to wet steam at 275° F. to atmospheric pressure and the machine has been drained. A pressure switch 2PS (6 oz. chamber pressure) associated with the internal pressure of the machine is now actuated by the reduced pressure and in conjunction with 1TS will now permit the seals at the doors to deflate. After the door seals have been deflated, the pressure switch 2PS permits the timer 1TR–18 to actuate V–10 which actuates valve 51 to open the rear door.

When the rear door opens, the spring loaded compression spring 126 previously referred to urges the dolly to move out of the machine. When the dolly is completely out of the machine at the exit conveyor, a micro air valve 53 actuates a four-way spool valve 51 which supplies air to air cylinder 20 which closes the rear door 15. When the rear door is fully closed, another air valve 6 furnishes air with opens the front door 14 and another full cycle of the machine may be carried out.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination a washer sterilizer, a plurality of trays, a water supply and a nozzle in said washer sterilizer connected to said water supply,
   tray support means in said washer sterilizer to support a tray,
   a plurality of trays adapted to be selectively supported on said tray support means,
   first said trays having spray means and a first seating means thereon, a fluid flow opening through said first seating means and means on said first seating means to be engaged by said nozzle whereby water is conducted from said nozzle, through said fluid flow opening to said spray means, second said trays having second seating means thereon adapted to engage said nozzle when a said second tray is supported on said support means above said nozzle, said second seating means substantially stopping flow of water from said nozzle when said nozzle engages said second seating means, said nozzle having means thereon actuated by fluid in said nozzles urging said nozzle into engagement with said seating means when a said tray is in position over said nozzle and water is connected from said water supply to said nozzle, said second seating means having a relatively small bleed hole therethrough adapted to bleed water from the space between said nozzle and said second seating means, said bleed hole connecting the space between said nozzle and said seating means with the inside of said washer sterilizer, said bleed hole being adapted to relieve the pressure of water between said nozzle and said second seating means whereby said nozzle is held in firm engagement with said second seating means by water pressure in said nozzle.

2. The combination recited in claim 1 wherein said washer sterilizer has two spaced doors, said means to support said trays comprises a track leading through said washer sterilizer from one said door to the other, and means on said washer sterilizer to position said trays with said seating means in operative relation with said nozzle.

3. The combination recited in claim 2 wherein said track is inclined downward from one said door toward the other whereby said trays are urged through said washer sterilizer by gravity.

4. The combination recited in claim 2 wherein said track comprises a fixed track part spaced from one said door and said means to position said trays comprises a first movable part of said track hinged relative to said fixed part of said track and means for swinging said hinged part of said track upward into engagement with said tray whereby said tray is urged toward one said door.

5. The combination recited in claim 4 wherein said track has a second movable part swingably attached to said fixed part of said track and spaced from said first movable part, and means for engaging said second movable part of said track for swinging it upward and thereby urging a said tray toward said first movable part of said track whereby the said tray is held in position between said movable parts over said nozzle.

6. The combination recited in claim 5 wherein one said movable track part has resilient means thereon engaging said trays when they are disposed in said washer sterilizer and adapted to initiate movement of a said tray from said washer sterilizer when a said door is opened.

7. The combination recited in claim 4 wherein one said door comprises said means for swinging said movable parts of said track, and said door comprises a sliding door sliding upward to closed position and engaging said movable part of said track when said doors slide to a closed position.

8. The combination recited in claim 7 wherein said washer sterilizer has a control circuit, and actuating means connected to said doors and to said water supply means whereby said doors are moved to closed position when a said tray is in position in said washer sterilizer and said water supply is turned on when a said tray is in position in said washer sterilizer and said doors are closed.

9. The combination recited in claim 8 wherein said control circuit has means thereon to open one of said doors when a washing cycle of said washer sterilizer is completed.

10. The combination recited in claim 8 wherein some said trays have a memory device thereon, said washer sterilizer has means to provide wash and rinse functions and said washer sterilizer has means thereon cooperating with said memory device for controlling the sequence of said washing and rinsing functions of said washer sterilizer.

11. The combination recited in claim 1 wherein said track has a fixed part in said sterilizer spaced from said doors and a movable part swingably attached to one end of said fixed part and said means to position said trays comprises said movable part of said track and means for swinging said hinged part of said track upward into engagement with said tray whereby said tray is held in position over said nozzle.

12. The combination recited in claim 1 wherein said water supply means comprises a pump on said washer sterilizer and control means on said washer sterilizer for controlling said pump.

13. The combination recited in claim 1 wherein said nozzle is made up of a first hollow part and a second hollow part, said second hollow part being telescopically received in said first hollow part, and said means urging said nozzle into engagement with said tray comprises a flange member on said second nozzle adapted to be engaged on one side thereof by water under pressure in said first hollow member.

References Cited

UNITED STATES PATENTS

| | | | |
|---|---|---|---|
| 1,954,222 | 4/1934 | Olson | 134—167 |
| 3,017,892 | 1/1962 | Mixon | 134—176 |
| 3,064,665 | 11/1962 | Martiniak | 134—165 XR |

FOREIGN PATENTS

| | | |
|---|---|---|
| 1,380,105 | 10/1964 | France. |

ROBERT L. BLEUTGE, *Primary Examiner.*